United States Patent [19]

Chaczyk et al.

[11] Patent Number: 5,009,122
[45] Date of Patent: Apr. 23, 1991

[54] SEALED CABLE CONTROL SYSTEM

[75] Inventors: Adam W. Chaczyk, Sterling Heights; John M. Baumgarten, West Bloomfield, both of Mich.

[73] Assignee: Babcock Industries, Inc., Fairfield, Conn.

[21] Appl. No.: 461,032

[22] Filed: Jan. 4, 1990

[51] Int. Cl.⁵ .......................... F16C 1/10; F16J 15/50
[52] U.S. Cl. ...................................... 74/502.6; 74/502; 74/501.5 R; 74/18; 74/18.20
[58] Field of Search ............................... 74/500-502, 74/18, 18.10, 18.20

[56] References Cited

U.S. PATENT DOCUMENTS

| | | | |
|---|---|---|---|
| 2,944,639 | 7/1960 | Blake | 74/18 |
| 3,019,663 | 2/1962 | Breunich | 74/502 |
| 3,031,865 | 5/1962 | Weasler | 74/502 |
| 3,995,502 | 12/1976 | Jones | 74/18.2 |
| 4,442,923 | 4/1984 | Wakatsuki et al. | 74/501.5 R |
| 4,721,175 | 1/1988 | Butler | 74/18 |
| 4,753,123 | 6/1988 | Stormont | 74/501.5 R |

Primary Examiner—Vinh T. Luong
Attorney, Agent, or Firm—Barnes, Kisselle, Raisch, Choate, Whittemore & Hulbert

[57] ABSTRACT

A sealed cable control system having an integral, internal air transfer system constructed and arranged to provide a continuous passage comprising a series of integral, internal unrestricted passages within and through the control system to maintain a relatively uniform pressure within the boots and conduit and within the cable control system as the end members of the cable control system reciprocate. An air transfer system which includes air transfer fittings sealed to a tube therebetween to allow an efficient transfer of air within the system, thereby permitting the maintenance of a closed constant volume, constant pressure environment.

6 Claims, 3 Drawing Sheets

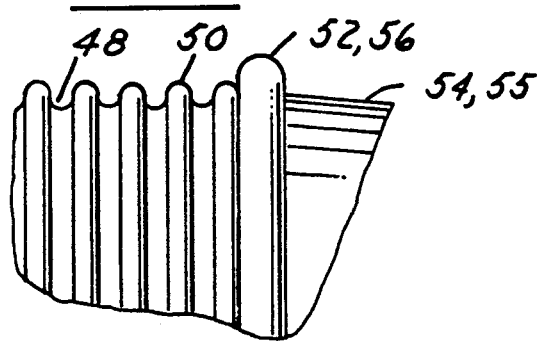
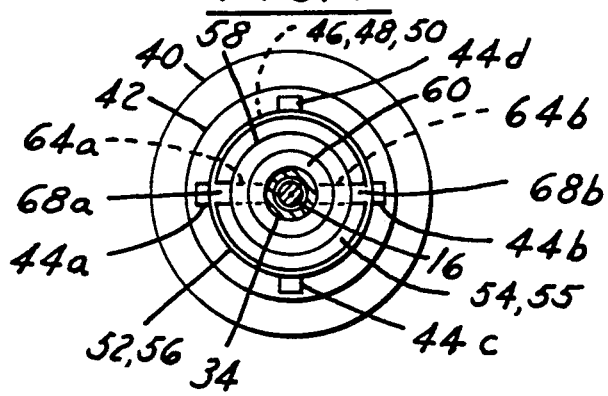
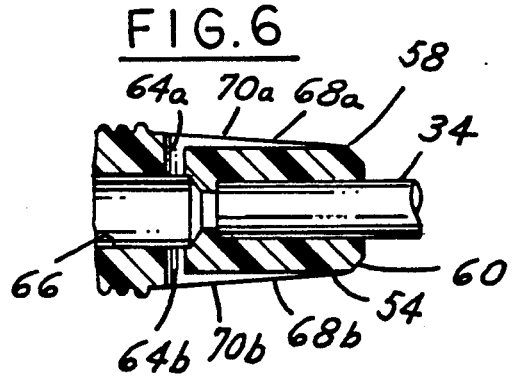

SEALED CABLE CONTROL SYSTEM

BACKGROUND OF THE INVENTION

This invention relates to sealed cable control systems.

DESCRIPTION OF THE PRIOR ART

Cable control systems are commonly used to control or operate a mechanism. A cable control system may include end members which reciprocate, and a third member connected therebetween. The third member or cable transmits the forces exerted by one reciprocating member to the other. Protective boots may be used to isolate members of a cable control system from the environment. In some configurations more than one protective boot may be required. For example, it may be necessary to have one boot at a first end to encompass one of a pair of reciprocating members and a second boot at a distant end to encompass the other reciprocating member. A third boot or conduit may encompass the cable. As the end members or shafts reciprocate within the respective distant boots, the volumes of the boots change. For example, as a shaft is moved in one direction one boot, which encompasses a shaft, collapses and pressure increase occurs within the boot as the boot collapses. As a result of the pressure increase there is a resistance to the movement of the shaft which inhibits the free movement of the control system. Therefore, it is desirable to maintain a relatively constant pressure within two separated boots and the conduit as the reciprocating members extend from a neutral position and then contract from a neutral position.

In a typical system, each of the rigid shafts is protected within a boot and the flexible shaft or cable is protected within a conduit which is adapted to be sealed to each of the two boots. The transfer of air from one boot to the other occurs through the conduit as the shafts reciprocate. This is not a very effective means of transferring air to maintain a relatively constant pressure within the two distant, remote boots. The lack of effective air transfer therefore results in a pressure increase at one point in the system which inhibits the movement of the shafts and cable and therefore renders the control system less effective. There is a corresponding relatively lower pressure at another point in the system which may cause the inspiration of atmospheric contaminants.

In the case of a typical automotive transmission shift cable control the shafts and cable must be totally protected from the environment. As the shaft, encompassed by one boot, retracts the boot collapses and the pressure therein increases, causing a resistance to the movement of the shafts and cable within the boot and conduit. Therefore, it is desirable to have a means to provide a redistribution of air within all points of the sealed cable control system. It is also desirable to have a more effective and efficient means to allow the passage of air from the interior of one boot to the interior of another boot to maintain a relatively constant pressure.

SUMMARY OF THE INVENTION

It is an object of the invention to provide a sealed cable control system which includes reciprocating members, protective boots and an air transfer system to equalize the pressure in the system as the members reciprocate. The air transfer system includes air transfer fittings sealed to a tube therebetween to allow an efficient transfer of air within the system, thereby permitting the maintenance of a closed constant volume, constant pressure environment around reciprocating members including shaft and cable members enclosed herein.

In accordance with the invention, a cable control system comprises a first member and a second member connected by a third member therebetween. The first and second members are each reciprocating members of the control system and desirably are shafts. The first and second members, or shafts, are connected by the third member which is desirably a cable. The first and second members, or shafts, are enclosed in respective sealed protective boots, each of which is sealed to a conduit which encompasses the cable connected between the respective shafts.

Means are also provided for effectively sealing the cable control system from the environment while at the same time efficiently and effectively equalizing the pressure within the sealed system. The invention comprises a sealed cable control system having sealed protective boots or bellows with an integral, internal air transfer system.

An air transfer system comprises a pair of air transfer fittings each of which is sealed at one end to one of two boots. A tube is sealed to the other end of each of the two fittings. The tube is coextensive with the cable between the two boots.

The first air transfer fitting communicates with the interior volume of the first boot, the second air transfer fitting communicates with the second boot, and both fittings communicate with the enclosed volume provided by the tubing which encompasses the conduit or cable.

The air transfer system is constructed to facilitate the passage of air from the interior of one sealed protective boot, through one fitting, then through the tube and to the other fitting and then to the interior of another sealed protective boot, to thereby maintain a relatively constant pressure within the entire cable control system. Preferably, each fitting is adapted to be sealed at one end to the tube and at the other end to a boot which encompasses one of two reciprocating shafts. The tube is sealed to, and joins, the two fittings and is coextensive with the length of the cable or conduit which encompasses the cable. Preferably, the tube is flexible.

The tube joins the two fittings such as to allow effective movement of air within the entire sealed system to equalize the pressure within the entire system. Accordingly, as the shafts and cable move displacing air from one point in the system, it is easily transferred to all other points in the system. For example, air may pass from the interior of one boot through the first fitting, through the tube, through the other fitting and then to the other boot. Thus the air travels from the first boot to the second boot through the tube, as well as through the conduit, without escaping to the atmosphere. Therefore, when a boot collapses a pressure increase is avoided, and as a boot expands, a relatively low pressure is avoided. The inspiration of atmospheric contaminants at a relatively low pressure point in the system is prevented, and a build up of pressure which impedes cable control movement is also avoided as the shafts reciprocate.

BRIEF DESCRIPTION OF THE DRAWINGS

FIG. 4 is an enlarged view taken in the encircled portion in FIG. 2.

FIG. 5 is an end view taken along the line 5—5 of FIG. 3.

FIG. 6 is a sectional view generally taken along line 6—6 of FIG. 3.

DETAILED DESCRIPTION OF THE INVENTION

Figure 1:
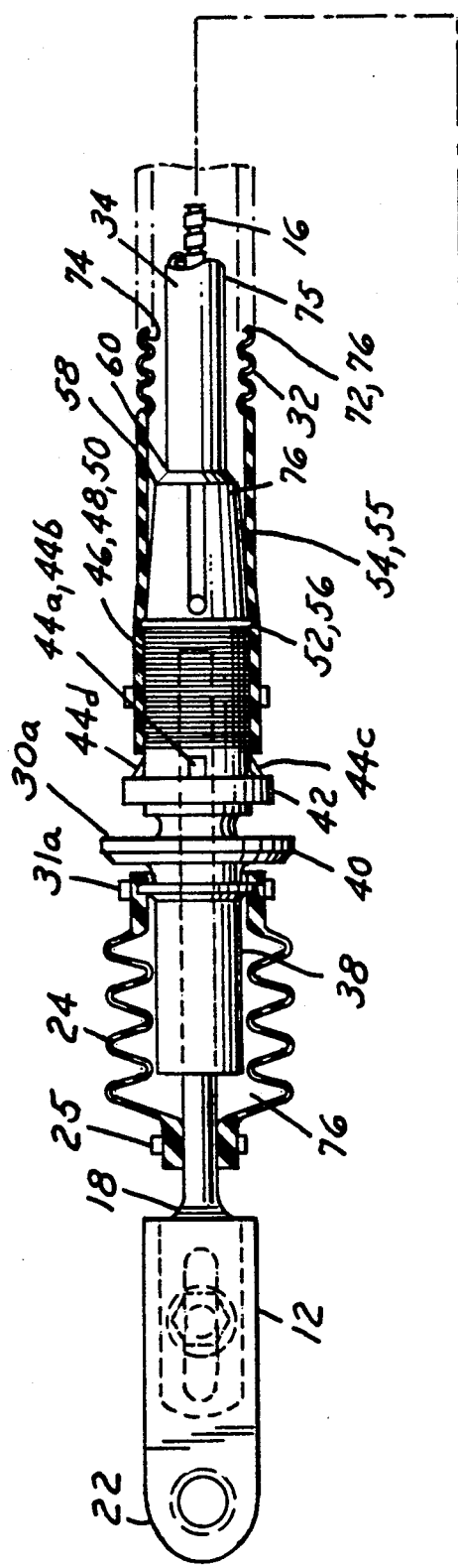
FIG. 1 a part-sectional, fragmentary, front, elevational view of a sealed cable control system which includes shaft and cable members enclosed in a protective boot having an air transfer system.

Referring to FIG. 1, a sealed cable system with an integral air transfer system 10 is shown which embodies the invention. The system 10 has a first end member 12 and a second end member 14 connected to one another by a third member, cable 16 that is fastened to shaft 18 on first end member 14 and shaft 20 on second end member 14. Cable 16 moves axially as shaft 18 on end member 12 and shaft 20 on end member 14 move together. First end 12 basically comprises a molded rod end 22 which is connected to the shaft 18. Shaft 18 is enclosed in a boot 24 which is sealed to shaft 18 by a connector 25. Second end 14 generally comprises a molded rod 26 connected to shaft 20. Shaft 20 is enclosed in a boot 28 which is sealed to shaft 20 by a connector 29. Boot 24 is sealed to an air transfer fitting 30a by a sealed connector 31a. Boot 28 is sealed to an air transfer fitting 30b by a sealed connector 31b.

Figure 2:
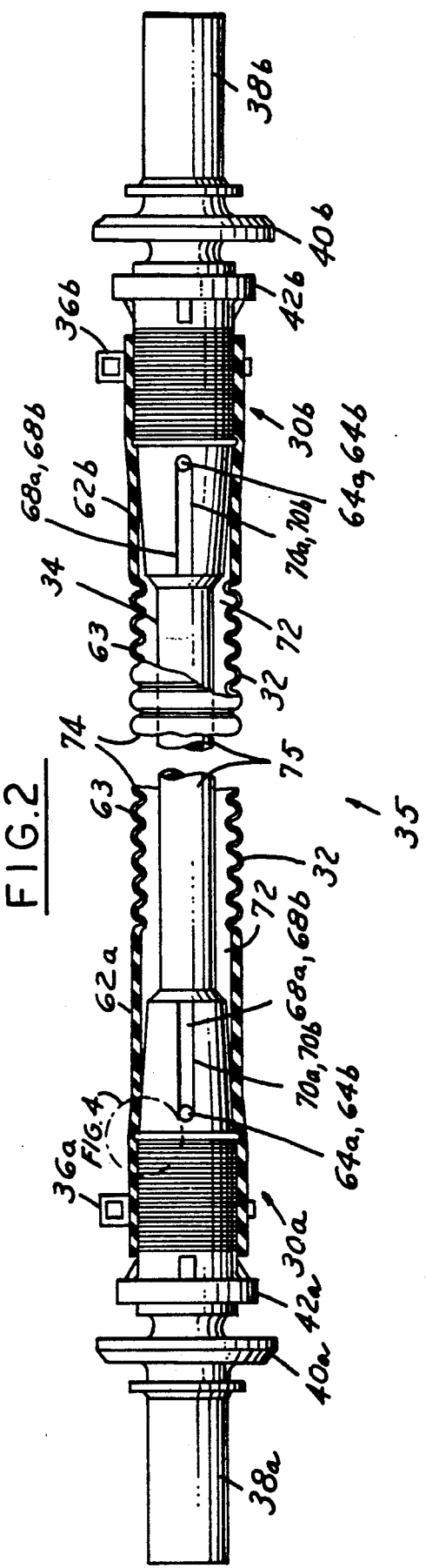
FIG. 2 is a fragmentary, front, elevational view, partially in of the air transfer system.

Referring to FIG. 2, an air transfer fitting 30a is sealed to a tube 32. The fitting 30a is also adapted to be sealed within a conduit 34 which encompasses cable 16. An air transfer fitting 30b is adapted to be sealed to tube 32. The fitting 30b is also adapted to be sealed to conduit 34 which encompasses cable 16.

Air transfer fitting 30a encompasses first end member 12 which comprises shaft 18 and cable 16. Shaft 18 is connected to cable 16 within air transfer fitting 30a. Air transfer fitting 30a is sealed to conduit 34 and conduit 34 is coextensive with cable 16 along its entire length to the second end member 14. Air transfer fitting 30b encompasses shaft 20. Air transfer fitting 30b is sealed to conduit 34 and encompasses cable 16 and shaft 20. Cable 16 is connected to shaft 20 within air transfer fitting 30b.

Referring to FIG. 2, air transfer system subassembly 35 generally comprises the air transfer fittings 30a, 30b and tube 32. Preferably, air transfer system 35 also comprises securing straps 36a, 36b to facilitate sealing of the respective air transfer fittings 30a and 30b to tube 32.

Figure 3:
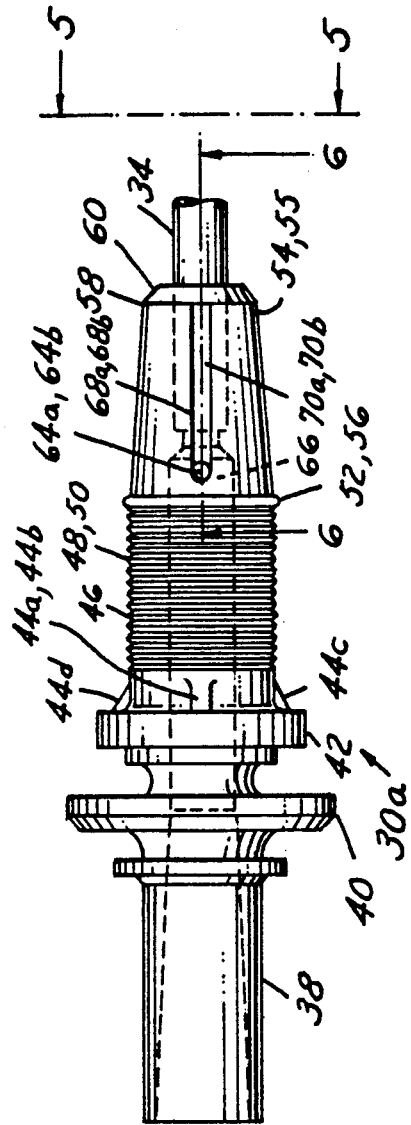
FIG. 3 is an enlarged fragmentary, front, elevational view of the air transfer fitting.

Desirably, air transfer fittings 30a and 30b are essentially similar. Preferably fittings 30a, 30b are identical and will be described by reference to fitting 30a as shown in FIGS. 1-3. Air transfer fitting 30a comprises a cylinder 38 at the other end which is constructed to enclose a shaft 18 (hidden lines in FIG. 3) and which is constructed to be sealed to boot 24 at sealed connector 31a near collar 40 on fitting 30a. Collar 40 is also adapted to be connected to a collar 42 which is secured by ribs 44a, 44b, 44c and 44d to a cylinder 46 which includes grooved section 48 which comprises circumferential grooves 50. Cylinder 46 is connected at collar 52 to cylinder 54 which has a diameter 56 at collar 52 and which tapers to a diameter 58 at its other end and has a conical section 60 adapted to be sealed to conduit 34.

The grooved section 48 has circumferential grooves 50 as shown in FIG. 4. The grooves 50 facilitate the sealing and securing of tube 32 to the air transfer fittings 30a, 30b.

Referring to FIGS. 2 and 3, air transfer system subassembly 35 comprises the air transfer fittings 30a, 30b and tube 32, connected therebetween and sealed to fittings 30a, 30b. Tube 32 is preferably of a flexible material such as rubber, plastic and the like, and has three sections, two end sections 62a, 62b connected to a middle section 63. Each one of the end sections 62a, 62b is respectively sealingly connected to fittings 30a, 30b.

The tightening of strap 36a around tube end 62a causes the interior surface of tube end 62a to flow into grooves 50 of section 48, thereby sealingly fastening tube 32 to fitting 30a. Correspondingly, the tightening of strap 36b causes end 62b to be sealingly fastened to fitting 30b.

Air transfer fitting 30a, as shown in FIGS. 3, 5 and 6, comprises a pair of radial ports 64a, 64b each of which extends from the surface of cylinder 54 through an interior axial channel 66 of fitting 30a, adjacent conduit 34. Ports 64a, 64b are opposed 180° apart on the circumference 55 of cylinder 54, as shown in FIGS. 3, 5 and 6.

Internal channel 66 communicates with ports 64a, 64b and ports 64a, 64b communicate with respective slots 68a, 68b, as shown in FIGS. 3 and 6. Internal channel 66, ports 64a, 64b and slots 68a, 68b thereby form passages 70a, 70b. Slots 68a, 68b are formed by grooves cut into a portion of the exterior of cylinder 54. Preferably, the grooves taper longitudinally as cylinder 54 tapers from diameter 56 to 58.

Air may travel from passages 70a, 70b through the chamber 72 disposed between interior 74 of tube 32 and exterior 75 of conduit 34. Passages 70a, 70b of fitting 30a, chamber 72 and passages 70a, 70b of fitting 30b thereby form continuous passage 76 of the air transfer system 35.

When shafts 18 and 20 move in one direction from a neutral position, air expelled from boot 24 at one end may pass through passages 70a, 70b, formed by interior channel 66, ports 64a, 64b and slots 68a, 68b, of fitting 30a and then through the passages of chamber 72, and then to fitting 30b at the other end and through passages 70a, 70b in the other fitting 30b formed by interior channel 66, ports 64a, 64b and slots 68a, 68b of fitting 30b and into boot 28 at the other end.

When shafts 18 and 20 move in an opposite direction from neutral, air may travel from boot 28 through continuous passage 76 formed by passages 70a, 70b of boot 30b, chamber 72 and passages 70a, 70b of fitting 30a, and into boot 24.

It can thus be seen that there has been provided a sealed cable control system which includes reciprocating members, protective boots and an air transfer system to equalize the pressure in the system as the members reciprocate. The air transfer system includes air transfer fittings sealed to a tube therebetween to allow an efficient transfer of air within the system, thereby permitting the maintenance of a closed constant volume, constant pressure environment around reciprocating members including shaft and cable members enclosed herein.

I claim:

1. A cable control system including respective first and second sealed protective boots,
   a sealed conduit connected therebetween, a pair of air transfer fittings comprising a first fitting and a second fitting, said fittings being sealingly connected to said respective boots and conduit and constructed and arranged to provide a passage from the interior of said boot and through said fitting and along a portion of the exterior of said fittings, and said portion adjacent the exterior of said conduit, a tube encompassing said conduit and at least said portion of said fitting, said tube providing a sealed chamber forming a passage around said conduit and at least said portion of said fitting, said chamber being sealingly connected to each respective end of said tube to each respective one of said pair of air transfer fittings, and said passage and said chamber being sealingly connected and constructed and arranged to provide a continuous passage from the interior of said first boot, through said first fitting and along said portion then through said chamber forming a passage, to said second fitting and along said portion of said second fitting and through said second fitting and then through said interior to said second boot, each said air transfer fitting being in the shape of a cylinder adapted to be sealed at one end to said first boot and having another end which is tapered and is sealingly connected to said conduit, a pair of ports in said cylinder, each of said ports extending from the surface of said cylinder and radially inwardly and through said cylinder to an interior channel within said cylinder constructed and arranged to form a passage between the interior of said boot and the exterior of said cylinder, a pair of slots formed by grooves cut along a portion of the surface of said cylinder, said slots extending generally axially along said portion of the exterior of said cylinder and disposed about 90° to said radially extending ports, said slots being constructed and arranged with respect to said ports to form a passage from the interior of said boot to the exterior of said cylinder and axially along said portion of the exterior of said cylinder.

2. The sealed cable control system set forth in claim 8 wherein said flexible means comprises a flexible tube.

3. The air transfer system set forth in claim 1 comprising circumferential grooves on said cylinder, said tube being flexible and pleated sealingly connected to each of said fittings by engaging the circumferential grooves of the exterior grooved section of said cylinder.

4. The air transfer system set forth in claim 5 wherein said slots and said ports are disposed between said conduit and said grooved section.

5. The air transfer system set forth in claim 6 wherein said ports are 180° apart on the circumference of said cylinder and said slots are 180° apart along said portion of the exterior surface of said cylinder.

6. A cable control system comprising a flexible conduit, a cable extending through said conduit and having a length greater than the length of said conduit, a fitting sealed at each end of said conduit and having an opening through which said cable extends, flexible means extending between said fittings about said conduit and providing first passage means between said fittings and external to said conduit, a boot at each end of the system sealingly engaging and fixed to the portion of the cable which extends beyond the respective fitting and sealingly engaging the respective fitting, and second passage means in each fitting extending from said first passage means through said fitting to the interior of said conduit at the respective end such that air may pass freely from within the boot at one end to the boot at the other end.

* * * * *